W. H. HEINE.
PROCESS OF OBTAINING FERTILIZER.
APPLICATION FILED MAY 28, 1913.
1,122,923.
Patented Dec. 29, 1914.
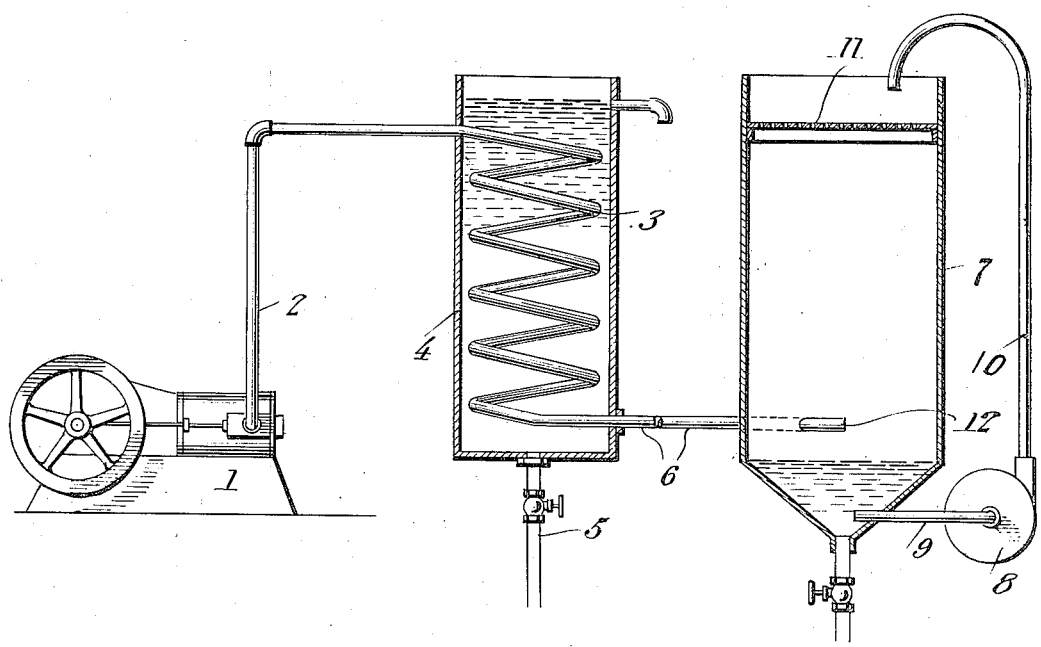
Witnesses
Inventor
W. H. Heine
By Victor J. Evans
Attorney

UNITED STATES PATENT OFFICE.

WILHELM H. HEINE, OF HONOLULU, TERRITORY OF HAWAII.

PROCESS OF OBTAINING FERTILIZER.

1,122,923.  Specification of Letters Patent.  Patented Dec. 29, 1914.

Application filed May 28, 1913. Serial No. 770,408.

*To all whom it may concern:*

Be it known that I, WILHELM H. HEINE, a citizen of the United States, residing at Honolulu, in the county of Honolulu and Territory of Hawaii, have invented new and useful Improvements in Processes of Obtaining Fertilizer, of which the following is a specification.

The object of the present invention is to provide a cheap and efficient process for obtaining fertilizer from the gases escaping from an ordinary gas engine.

In carrying out my process the products of combustion from an ordinary gas engine are first run through a suitable cooling device, after which they are passed through a chamber in which they are treated, with a shower of lime water.

The accompanying drawing shows a diagrammatic side elevation, partly in section, of the apparatus used in carrying out my process.

In said drawing, 1 represents an ordinary gas engine, which may be of any of the usual types now in use. The gaseous products of combustion are passed by means of a pipe 2, through a worm 3, located within a chamber 4, which chamber is provided at the bottom with a water inlet 5, controlled by a suitable valve as illustrated.

The gases after having been passed through this cooler are conveyed by means of a pipe 6, to an absorption chamber 7, in which they are treated with a shower of lime water, which liquid is caused to pass downwardly through the ascending gases a number of times, for example, by means of the pump 8 and pipes 9 and 10. The liquid leaving the pipe 9 is distributed by means of the perforated plate 11, in such a manner as to produce a shower of lime water, which will come very thoroughly into contact with the gases passing upwardly through the absorption chamber.

The liquid after having been used for some time in connection with the gas is drawn off from the bottom of the absorber and may be treated by either of the two following steps.

The liquid together with whatever solid matter may be mixed with it, is evaporated to dryness to form a fertilizer; or the liquid may be added to the water used in irrigating land.

While I am unable to give a full and complete statement of the chemistry involved in this process, it has been found that the fertilizer produced in this manner contains, among other things some calcium nitrate which is a very efficient fertilizer, since it contains both calcium and nitrogen in a readily soluble condition.

The fertilizer also contains a considerable amount of nitrogen, existing in the form of amido compounds, of uncertain and variable composition. The composition of these amido compounds, also the relative amounts thereof, will depend upon a very great number of factors, such as the highest temperature existing in the cylinder of the internal combustion engine, the speed of the engine, the rate of cooling of the gases after leaving the engine, the temperature of the lime water employed in the absorber, and perhaps other factors.

The cooler and absorber can be attached to any gas engine and will produce this valuable by-product at substantially no cost, consequently the process is extremely economical.

In order to obtain a very thorough mixture of the gas with the lime water, the pipe 6 may enter the absorber 7 tangentially as illustrated at 12.

I call attention to the fact that the gas engine is run in my process, in the usual way, and it is not at all necessary to introduce water or other cooling agents, into the interior of the cylinder, at any stage of the operation. This is a surprising discovery in view of U. S. Patent to Hausser, 961,350, June 14, 1910.

What I claim is:

A process of producing a fertilizer from the gaseous products of combustion of a gas engine which comprises cooling these products, then treating the same with lime water in a suitable absorber, said lime water being circulated in contact with said gas until a desired amount of fertilizing substances have been absorbed thereby.

In testimony whereof I affix my signature in presence of two witnesses.

WILHELM H. HEINE.

Witnesses:
E. M. CAMPBELL,
H. DUNSHEE.